The function of the system 38 is to preliminarily identify those lines that lie without the window (defined by the contents of the window registers 30 in the data processing system 26. As indicated above, if both ends of the line are to the right, left, above or below the window, the entire line is known to be outside the window and the line can be rejected. More specifically, the lines which may be rejected, includes those which lie with their start and end points to: the left of the window edge WL, above the window edge WT, below the window edge WB or to the right of the window edge WR. These lines are manifest by the sign digits for the start and end points of the lines and specifically indicate rejection situations upon occurrence of each of the following conditions:

$$ST_s \cdot ST_e = 1$$
$$SR_s \cdot SR_e = 1$$
$$SB_s \cdot SB_e = 1$$
$$SL_s \cdot SL_e = 1$$

Thus, the above expressions define one portion of the logic network of the system 38. Upon occurrence of a rejectable line the system 38 provides a pulse to the system 26 via a conductor 44. That is, the indication of a pulse in conductor 44 is that neither the line nor any part thereof is to be included in the defined window. Lines which are entirely contained within the window and therefore do not require further processing are also recognized by the system 38 and eliminated from further consideration. Specifically, lines producing a "0" output from the following logic test are recognized to lie entirely in the window, $$0 = ST_s + SB_s + SL_s + SR_s + ST_e + SB_e + SL_e + SR_s$$

Thus, the above expression is logically embodied in the system 38 (along with the rejection logic) as well known in the art, to provide a pulse through a conductor 41 to indicate that the line under consideration need not be clipped.

The remaining signals (representative of the lines under consideration or those passing the preliminary test and which may be fragmentarily in the window) are applied to a gate 48 from the system 26. The gate 48 is qualified by the negation signals in conductors 40 during a time interval $t_2$ and passes the line-defining coordinate signals to a clipping system 50. The signal in line 40 is actually formulated as the combined "and" of the negation of signals in conductors 41 and 44.

The clipping system 50 which receives the vector coordinate signals is independently timed and defines the portion of a line which lies within the window as defined by signals in the window registers 30 of the system 28. In this regard, the interpolation system described below may also be employed to accomplish scaling operations on a line; however, for present consideration of the system, it may be presumed that well-known scaling techniques may be employed by the data processing system 26 to accomplish the desired adjustment.

The clipping system having defined portions of lines for display, it provides that information through: a cable 52, the data processing system 26 and a cable 54 to the display unit 42. Recapitulating, as disclosed in detail below, the clipping system 50 performs the operations summarized above and with reference to FIG. 4, to provide a defined line which lies within the window of concern.

Preliminary to considering the clipping system 50 in detail, some further analysis will be made with regard to FIG. 7. Functionally, the initial operation of the clipping system is to locate the midpoint of a line under consideration. Various operations may be performed to accomplish the midpoint in a cyclic or reiterative process. For example, the coordinates of the end points can be added and the result divided by "2" to obtain the midpoint. In such an arrangement the start point coordinates are contained in a set of registers 56 and added (by a set of adders 60) to the end point coordinates from the registers 58. For example if a coordinate of the start point were "–10" and the similarly referenced coordinate of the end point were "+8;" the midpoint coordinate would be "–1," $(8-10/2)=-1$.

Alternatively, the midpoint can be determined by registering the starting point $s$ of the line in the registers 56 while the length of the line is contained in the registers 58. By registering this information in binary form, a single shift in the registers 58 accomplishes a division by two. Subsequently, by adding the "half-length" components of the line from the shift registers 58 to the starting point in the registers 56 (all in rectangular vector coordinates referenced to the window edges) a sum is provided from an adder 60 which is representative of the midpoint M of the line.

The details of one exemplary clipping system are set forth in FIG. 8 and will now be considered. It is to be noted initially that the quantities: XLS, XRS, YBS and YTS are registered (with their associated signs *SL*, *SR*, *SB* and *ST*) in the registers 61, 62, 63 and 64 respectively during the time $t_2$. Somewhat similarly, and during the same interval, the quantities: XLE, XRE, YBE and YTE (with their associated signs *SL*, *SR*, *SB* and *ST*) are registered respectively in the registers 65, 66, 67 and 68 respectively.

These quantities are placed in the identified registers through sets of gates 70 and 72 (components of gang gate 48, FIG. 6) which are connected to the data processing system 26 (FIG. 6) and which are qualified during an interval $t_2$. Additionally, during the same interval, a similar set of gates 74 is qualified to pass rectangular coordinate information definitive of the length of the line from storage locations in the system 26. Specifically, information representative of the $dx$ coordinate of the line is placed in shifting registers 76 and 77 from the system 26 (FIG. 6). Similar information for the $dy$ component lengths of the line is placed in shifting registers 78 and 79 through the gates 74.

On completion of the preliminary transfer operations, the contents of the shift registers 76, 77, 78 and 79 is shifted one digit position (to lower orders of significance) by application of the signal $t_{3\text{-}1}$. As a consequence, the $dx$ and $dy$ component lengths of the line are divided by "2" due to the fact that these registers are of a binary structure and as well known in the prior art of binary shift registers. Of course other radix systems could well be employed in other systems.

Continuing with the sequence of operations, the occurrence of timing pulse $t_{3\text{-}2}$ applied at each of the adders 80, 81, 82 and 83 actuates these adders to combine the contents of the component half-lengths of the line with the signals indicative of the starting points of the line. Specifically, the contents of the register 76 (representing one half the abscissa length of the line) is applied to the adder 80 along with the contents of the register 61 (XLS). As a consequence, of the addition, the output of the adder 80 is representative of XLM, i.e., the "X" coordinate distance from the left edge of the window to the midpoint of the line. An analytical presentation of this operation is presented by FIG. 9. Specifically, for example, the quantity $-XLS + dx/2$ may be seen to develop a quantity +XLM, which is one of the coordinates definitive of the midpoint of the line. Similar additions involve: XRS and $dx/2$; YBS and $dy//2$; and YTS and $dy/2$ to derive the other edge-referenced coordinates of the midpoint.

The interval of time defined by the signal $t_{3\text{-}2}$ may be subdivided to accomplish various forms of serial or parallel addition, as well known in the prior art. As a part of the addition, the sign digits for the midpoint are established for each of the sums. In general, the sign digit signals (*SL*, *SR*, *SB* and *ST*) for the start, mid and end points indicate whether or not any of these points lie in the window. If none do, the process becomes that of Case A as described above. Conversely, if one or more of the points lies in the window, the process becomes one of the Cases B–G. The sign signals *ST*, *SB*, *SL* and *SR* (definitive of the line, start end and midpoints) are applied to the sign logic system 84 as four-digit binary numbers that indicate whether the points are in or out of the window and are employed as set forth in FIG. 4. Specifically, the digits *OC* define the points to be within the window by containing all "-zeros" and outside the window if they contain any "1's."

The signal-represented inputs to the circuit 84 logically define unique situations, e.g., cases, which in turn define the next steps of the process of clipping or interpolating the line. If

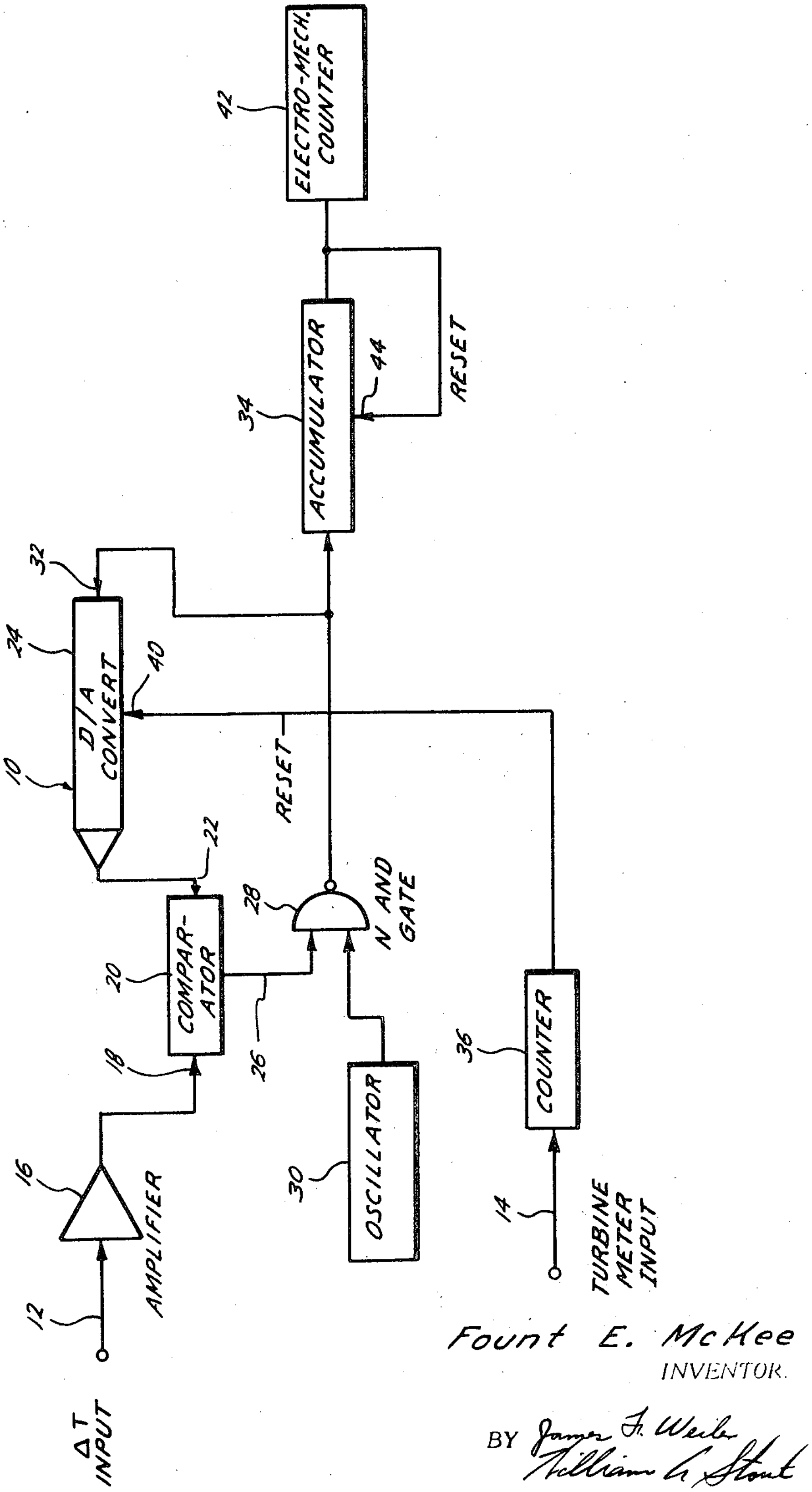
Fount E. McKee
INVENTOR.
BY James F. Weiler
William G. Stout
ATTORNEY

APPARATUS FOR MEASURING THE CHANGE IN THE THERMAL ENERGY OF A FLOWING FLUID

BACKGROUND OF THE INVENTION

The present invention relates to improvements in the accuracy of measuring and computing the change in thermal energy of a flowing fluid. Presently there are several prior art devices available which will measure and compute the change in thermal energy in a flowing fluid such as the flow of cooling water through a heat exchanger. However, the accuracy of these devices is generally no better than plus or minus 5 percent for varying fluid flow and temperature changes.

The usual equation for computing and measuring the change in thermal energy of a flowing fluid is as follows:

$$Q=K(\Delta T)(FR)(t)$$

Where, $K$ is a constant, $\Delta T$ is the temperature difference between the temperature of the incoming fluid and the outgoing fluid, $FR$ is the flow rate of the fluid, $t$ is the time, and $Q$ is the total change in the heat content of the fluid over the time $t$ which may be expressed in any suitable matter such as B.t.u., calories, ton-hours, etc.

The usual way for making a measurement and computation is by measuring the temperature difference of the incoming and outgoing fluid in the form of an electrical current or voltage signal and measuring the flow rate of the fluid by a turbine meter in which the pulses from the turbine meter are converted to an analog voltage that is proportional to the flow rate. The differential temperature signal and the flow rate signal are multiplied together by means of an analog multiplier and the output of the multiplier is fed into an analog integrator which when it reaches its reset limit is reset and actuates a counter. This prior art operation is done by analog means which inherently produce poor accuracies.

SUMMARY

The present invention, therefore, has a general object of the provision of a measuring and computational means which will have inherently high accuracies, that is better than plus or minus one-half percent by utilizing a method and apparatus that is digital. The present invention is based on measuring the change in thermal energy each time a specified volume has passed through the heat exchanger. By measuring the change in thermal energy each time a specified volume flows by a given point, the thermal equation becomes:

$$Q=C(\Delta T)$$

Where, $C$ is a constant, and $Q$ and $\Delta T$ are as previously defined.

The present invention, therefore, converts the analog current or voltage signal representing the change in temperature into a number of pulses proportional to the magnitude of the analog signal each time a specified volume of fluid flows through the heat exchanger or other point being measured. The pulses are counted and accumulated and the total accumulation represents the quantity $Q$.

The present invention is therefore directed to providing an apparatus for measuring the change in the thermal energy of a flowing fluid with a flow rate measuring means such as a turbine meter and a differential measuring means such as a turbine meter and a differential measuring means such as a differential temperature transducer by providing an analog comparator having first and second inputs, the first input which receives the analog output signals from the temperature transducer with a digital to analog converter having input, output and reset, the output of which is connected to the second input of the comparator. Volume measuring means are connected to the turbine meter for counting the pulses from the turbine meter and providing a reset pulse to the converter each time a predetermined volume of fluid has been measured. An oscillator provides output pulses and is connected to a switching means such as a NAND-gate which is controlled by the output of the comparator and is closed when the temperature signal to the comparator is greater than the signal at the second input from the converter. The oscillator pulses from the switching means are transmitted to the converter and also to an accumulation means. Thus, the number of pulses from the oscillator is dependent upon and is proportional to the magnitude of the temperature signal each time a specified amount of fluid is measured. The pulses are counted and represents the total change in thermal energy of the flowing fluid.

BRIEF DESCRIPTION OF THE DRAWING

The drawing is a schematic representation of the apparatus of the present invention.

DESCRIPTION OF THE PREFERRED EMBODIMENT

Referring now to the drawing, the reference numeral 10 generally indicates the apparatus of the present invention. The inputs necessary to make the measurement and compute the change in thermal energy of a flowing fluid are a temperature input 12 which receives an analog electrical current or voltage from a conventional differential temperature transducer that is proportional to the difference between the temperature of the incoming and outgoing fluid to the apparatus being measured, such as a heat exchanger, and a flow rate input 14 from a flow rate measuring means such as from a conventional turbine meter which provides electrical pulses each of which signifies that a given volume of fluid has passed through the apparatus being measured such as a heat exchanger.

The present apparatus 10 accepts the temperature 12 and flow rate 14 inputs and by digital means produces an output which is the product of the inputs and time with the output being measured in any desirable units of heat such as B.t.u., ton-hour, calorie, etc.

The change in the input of the temperature signal at 12 is transmitted to any suitable amplifier 16, such as Model No. MC 1741 sold by Motorola Semiconductor Products, Inc., which standardizes the voltage applied to the first input 18 of a conventional analog comparator, such as Model No. MC 1741. The comparator 12 includes a second input 22 for receiving a second signal from a conventional digital to analog converter 24. The output 26 of the comparator 20 is connected to and controls a switching means such as a conventional NAND-gate 28, such as Model No. SN 7410 sold by Texas Instruments, Inc. When the temperature differential signal at the input 18 of the comparator is greater than the input 22 to the comparator 20, the output 26 of the comparator 20 is such that the NAND-gate 28 is enabled to allow pulses from a conventional alternating current oscillator 30, to pass through the NAND-gate 28. The oscillating pulses from the oscillator 30, when passed through the gate 28, are applied to an input 32 of the digital to analog converter 24. Simultaneously, the oscillator pulses passing through the gate 28 are transmitted to an accumulator 34 such as a conventional binary coded decimal register, such as Model No. SN 7490 sold by Texas Instruments, Inc.

The pulses from the oscillator 30 applied to the input 32 of the converter 24 and activates the digital to analog conversion process and when a sufficient number of pulses have been applied to the converter 24 to cause the output of the converter 24 which is applied to the input 22 of the comparator 20 to exceed the output of the amplifier 16 at the first input 18 of the comparator 20 the output 26 of the comparator 20 will change state thus inhibiting the NAND-gate 28 which prevents further passage of pulses from the oscillator 30 through the gate 28.

The pulses from the turbine meter are applied to the input and are applied to a conventional counter 36, such as Model No. 7492 sold by Texas Instruments, Inc. The counter 36 counts the pulses received from the turbine meter until a predetermined number of pulses have been counted which is a measure of a predetermined volume of fluid flowing. When this predetermined volume of fluid has been measured by the counter 36, a pulse from the counter 36 is applied to the reset terminal 40 of the converter 24. This reset signal causes the output of the converter 40 which is applied to the input 22 of the comparator 20 to go to zero, and in turn causes the output 26 of the comparator to change state and enable or close the NAND-gate 28 to allow passage of pulses from the oscillator 30. Thus, for each predetermined volume of fluid measured by the counter 36 the converter 24 is reset causing the comparator 20 to close the NAND-gate 28 and allow pulses from the oscillator 30 to be transmitted to the converter 24 and to the accumulator 34. Therefore, the number of pulses being transmitted through the NAND-gate 28 is proportional to the temperature difference of the predetermined volume of fluid flowing which is measured by the counter 36. The accumulator 34 stores the number of pulses which passes through the NAND-gate 28 from the oscillator 30 and when a predetermined number of pulses, which depend upon the temperature difference, flow rate and units of quantity displayed, have been accumulated in the accumulator 36, the accumulator 36 applies a pulse to an electromechanical counter 42 and at the same time applies a pulse to the reset terminal 44 of the accumulator 34. Thus, the accumulator 34 is reset and the counter 42 is advanced by one count and is a measure of Q, the total change in the heat content of the fluid.

Thus, in use, the flow rate input 14 is counted and when a predetermined number of pulses have been measured by the counter 36 which indicates a predetermined volume of fluid flow, the converter 24 is reset causing the input at 22 to the comparator 20 to go to zero. Then the application of any differential temperature signal at the input 18 will cause the NAND-gate 28 to close transmitting pulses from the oscillator 30 to the converter 24 and also to the accumulator 34. The accumulator 34 stores the pulses which pass through the NAND-gate 28 from the oscillator 30 and which were applied to the converter 24. When a sufficient number of pulses has been applied to the converter 24 to cause the output from the converter 24 to exceed the output from the amplifier 16 of the differential temperature signal, the comparator 20 will change state inhibiting the NAND-gate to prevent the further passage of pulses from the oscillator to the gate 28. Thus, the number of pulses passing through the gate 28 is a measure of the differential temperature signal and of heat change for each specified volume of fluid measured by the counter 36. The sequence is repeated for each specified volume of fluid flow measured by the counter 36 and is stored in the accumulator 34 and, when a predetermined quantity has been accumulated, will be dumped into and stored in the counter 42.

The present invention, therefore, is well adapted to carry out the objects and attain the ends and advantages mentioned as well as others inherent therein.

What is claimed is:

1. An apparatus for measuring the change in the thermal energy of a flowing fluid with a flow rate measuring means and a differential temperature measuring means comprising, an analog comparator, said comparator having two inputs, the first input receiving an analog signal from the temperature measuring means of the change in temperature of the fluid, a digital to analog converter having an output, an input and a reset, the output of the converter being connected to the second input of the comparator, the reset being actuated by the output of the flow rate measuring means when a predetermined volume of fluid is measured, an oscillator providing output pulses, the output from the oscillator being controlled by the output of said comparator, the output from the oscillator being controlled by the output of said comparator, the output from the oscillator being connected to the input of the converter when the first input of the comparator is greater than the second input, and counting means connected to the output of the oscillator and receiving pulses therefrom as a measurement of the change in thermal energy of the flowing fluid.

2. An apparatus for measuring the change in the thermal energy of a flowing fluid in which the flow rate is measured by a flow rate measuring means and a differential temperature measuring transducer having an output analog signal measuring the change in temperature of the fluid comprising, an analog comparator having first and second inputs, the first input of said comparator receiving the analog output signal from the temperature transducer measuring the change in temperature of the flowing fluid, a digital to analog converter having an input, an output and a reset, the output of which is connected to the second input of the comparator, means connected to the output of the flow rate measuring means and measuring the volume of the fluid flow and connected to the reset of the converter and actuating the reset upon a predetermined fluid volume measurement, an oscillator providing output pulses, switching means connected to the oscillator output, said switching means controlled by the output of the comparator and being closed when the temperature signal to the comparator is greater than the signal at the second input, the switching means being connected to the input of the converter providing a signal to the comparator which in turn allows the transmission of the oscillator pulses to the converter so long as the temperature signal is greater than the signal from the converter to the comparator, and counting means connected to the switching means whereby pulses received from the oscillator are a measurement of the change in the thermal energy of the flowing fluid.

3. The apparatus of claim 3 wherein the switching means is a NAND-gate.

4. The apparatus of claim 3 wherein the measuring means connected to the flow rate measuring means includes means counting the pulses from the flow rate measuring means and providing a reset pulse to the converter each time a predetermined volume of fluid has been measured.

5. The apparatus of claim 3 wherein said counting means includes, a binary coded decimal accumulator for counting the pulses from the oscillator, and an electromechanical counter connected to and actuated by the accumulator when a predetermined quantity of pulses has been counted by the accumulator.

* * * * *